United States Patent Office 3,458,546
Patented July 29, 1969

3,458,546
PEROXY CONTAINING ORGANOMETALLIC (IVb-TIN, GERMANIUM, SILICON AND LEAD) COMPOUNDS AND THE PREPARATION THEREOF
Ralph Lawrence Dannley, Cleveland, Ohio, Walter Alois Aue, Columbia, Mo., and George Carlton Farrant, Cleveland, Ohio, assignors to Ralph L. Dannley, Cleveland, Ohio
No Drawing. Filed July 26, 1966, Ser. No. 567,814
Int. Cl. C07f 7/22
U.S. Cl. 260—429.7    10 Claims

ABSTRACT OF THE DISCLOSURE

Peroxidic cotelomers and copolymers of Group IVb (tin, germanium, silicon and lead) metallo-organic derivatives with carbonyl compounds are produced by reacting an organometallic derivative of a Group IVb metal which derivative possesses a plurality of replaceable functional moieties of said metal which are active potential negative ion groups, hydrogen peroxide, and an aldehyde or a ketone. The said metallo-organic derivatives are useful as oxidizing agents, and as catalysts for reactions involving free radical intermediates.

---

The present invention relates generally to improvements in compositions of matter and methods of producing the same and it relates particularly to a novel derivative of a metallic Group IV element and a carbonyl compound united by oxide and peroxide linkages and to a method of producing the same.

It is a principal object of the present invention to provide an improved metallo-organic compound and method of producing the same.

Another object of the present invention is to provide improved peroxidic derivatives of Group IV metals and methods for producing the same.

Still another object of the present invention is to provide peroxidic cotelomers and copolymers of Group IV metallo-organic derivatives with carbonyl compounds and methods of producing the same.

A further object of the present invention is to provide compounds of the above nature characterized by their adaptability, convenience of use, and ease of production.

The above and other objects of the present invention will become apparent from a reading of the following description which sets forth preferred embodiments of the present invention.

In a sense, the present invention contemplates the provision of the reaction product of a polyfunctional organic derivative of a metal selected from the group consisting of silicon, germanium, tin, titanium, and zirconium, hydrogen peroxide, and an aldehyde, or ketone.

The product is characterized by the group $$-O-\underset{R_2}{\overset{R_1}{\underset{|}{\overset{|}{M}}}}-O-O-\underset{R_4}{\overset{R_3}{\underset{|}{\overset{|}{C}}}}-$$

wherein M is the aforesaid metal, $R_1$ and $R_2$ are selected from the group consisting of aliphatic straight chain radicals of 1 to 18 carbons, aliphatic branched chain radicals of 3 to 18 carbons, carbocyclic radicals of 5 or 6 carbons, aryl radicals of 6 to 24 carbons, aralkyl radicals of 7 to 24 carbons and the radical

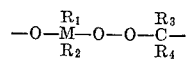

(if the chain is branched) and $R_3$ and $R_4$ are selected from the group consisting of hydrogen, aliphatic straight chain radicals of 1 to 18 carbons, aliphatic branched chain radicals of 3 to 18 carbons, aryl radicals of 6 to 24 carbons, carbocyclic radicals of 5 or 6 carbons, and aralkyl radicals of 7 to 24 carbons. It should be noted that the above radicals may contain substituents and that the cyclic radicals may be provided with side chains. The product has the general formula

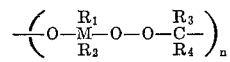

wherein $n$ is an integer from 1 to 100. If $n$ is a small number, for example less than 4, the product is telomeric and if $n$ is a large number, for example 4 or greater the product is polymeric. Thus, the product may be as low in molecular weight as corresponds to the compound $$R_1R_2R_3R_4MCO_4H_2$$

or may be highly polymeric with molecular weights of many thousands. The present compounds are characterized by normally being solid at room temperature thereby greatly expediting their use in many applications and are highly useful as oxidizing agents and as catalysts for reactions involving free radical intermediates. Where $n$ is greater than 5 the polymer may be linear, branched and/or cross-linked. The branching and cross-linking is advantageously effected at the metal moiety.

The method of producing the improved product in accordance with the present invention includes the steps admixing hydrogen peroxide, the carbonyl material, that is the aldehyde or ketone or a combination thereof, and one or more of the polyfunctional organic derivatives of the above identified Group IV metals. The hydrogen peroxide is advantageously added to the carbonyl material and the polyfunctional organic metal derivative in an organic solvent, for example, ether, dioxane, tetrahydrofuran, nitromethane and the like preferably at a temperature of between $-10°$ C. and $30°$ C., for example at $20°$ C. The improved product is solid and usually forms as a precipitate which may be separated from the liquid phase for example by cooling followed by filtration or, particularly where the product is soluble in the reaction mixture, by evaporation of the liquid, or the like and if desired the filtrate may be washed, and dried in vacuum. Advantageously, the molal proportion to the hydrogen peroxide of the carbonyl reactant is 0.5:1.5, and of the organo-metallic derivative 0.5:1.5, there preferably being a small excess of one mole of hydrogen peroxide to two moles of the carbonyl and metallic derivatives combined.

The polyfunctional organo-metallic derivative reactant may be bifunctional or trifunctional or a combination of these, the active moieties being potential negative ions, for example Cl, OH, $OCH_3$, $NH_2$, $OC_2H_5$, $N(CH_3)_2$, and the like. The general formulae for these reactants are $R_1R_2MX_2$ or $R_1MX_3$ where X is an active potential negative ion and $R_1$, $R_2$ and M are as above set forth. Where the organo-metallic derivatives are only bifunctional the resulting polymers are linear in nature. However, where the organo-metallic derivatives are trifunctional, in whole or in part, the resulting product is of a branched or cross-linked structure. The aldehydes and ketones are of the formula $R_3R_4C=O$ wherein $R_3$ and $R_4$ are as above set forth.

The following are examples of the radicals $R_1$, $R_2$, $R_3$ and $R_4$ both in the reactants and the end product; among the aliphatic straight chain radicals are methyl, ethyl, butyl, octyl, and the like, among the aliphatic branched chain radicals are isopropyl, isobutyl, isoamyl, tertiary-butyl and the like, among the carbocyclic radicals are cyclohexyl, cyclopentyl, methylcyclohexyl, and the like and among the aryl radicals are phenyl, p-tolyl, naphthyl, biphenyl and the like and among the aralkyl radicals are benzyl, xylyl, phenethyl, and the like. Specific examples of the carbonyl reactants are benzalactophenone, benzaldehyde, valeraldehyde, cyclohexanone, and the like and specific examples of the organometallic reactants are dimethyltindimethoxide, methylphenyldichlorosilane, diphenyldibromogermane, phenyltrichlorosilane, and the like.

It should be noted that the molecular weight of the end product, particularly in the production of polymeric products, may be readily controlled. The molecular weight may be kept low by diluting the reacting solutions, using only bifunctional metal derivatives ($R_1R_2MX_2$), or by incorporating some monofunctional metal derivatives (R′R″R‴MX)

High molecular weights may be obtained by employing more concentrated solutions, some trifunctional metal derivatives ($RMX_3$) or dicarbonyl compounds to effect crosslinking.

The following examples are given merely by way of illustration and are not intended to limit the scope of the present invention.

Example 1.—Peroxide from acetaldehyde and di-n-butyltin-dimethoxide

Hydrogen peroxide (98%, 0.148 g.) was added at room temperature to di-n-butyltin-dimethoxide (1.28 g.) and acetaldehyde (0.19 g.) in dry diethyl ether (50 ml.). The precipitate (1.24 g., 85%) which formed was collected by filtration, washed with dry ether and dried in vacuum. The peroxide melted (with decomposition) at 125° C.

Calculated for $C_{10}H_{22}O_3Sn$: C, 38.9; H, 7.1; Sn, 38.4. Found: C, 38.99; H, 7.14; Sn, 38.59.

Example 2.—Peroxide from benzaldehyde and diethyltin-dimethoxide

Hydrogen peroxide (98%, 0.2 g.) was added at room temperature to diethyltin dimethoxide (1.48 g.) and benzaldehyde (2 ml.) in dry ethyl ether, (50 ml.). The mixture was cooled (−10° C.) for one hour and filtered to collect the product (1.32 g., 68%).

Calculated for $C_{11}H_{16}O_3Sn$: C, 41.9; H, 5.1; Sn, 37.7; active oxygen, 5.1. Found: C, 41.47; H, 5.02; Sn, 37.7; active oxygen, 5.22.

Example 3.—Peroxide from p-chlorobenzaldehyde and di-n-butyltin-dimethoxide

Hydrogen peroxide (98%, 0.10 ml.) was added at room temperature to a solution of p-chlorobenzaldehyde (0.61 g.) and di-n-butyltin-dimethoxide (1 ml.) in ether (50 ml.). Cooling and filtration produced 1.40 g. (79%) of product with M.P. 113° C.

Calculated for $C_{11}H_{15}O_3ClSn$: C, 44.4; H, 5.7; Sn, 29.3; Cl, 8.7; active oxygen, 3.97; mol. wt. 349.2. Found: C, 44.60; H, 5.90; Sn, 29.51; Cl, 8.59; active oxygen, 40.8; mol. wt. 522.

Example 4.—Peroxide from valeraldehyde and di-n-butyltin-dimethoxide

Hydrogen peroxide (98%, 0.53 ml.) was added at room temperature to a solution of di-n-butyltin-dimethoxide (5 ml.) and valeraldehyde (2.87 ml.) in ether (100 ml.). Evaporation of the solvent gave a quantitative yield of product.

Calculated for $C_{13}H_{28}O_3Sn$: C, 44.5; H, 8.0; Sn, 33.8; active oxygen, 4.65; mol. wt. 351. Found: C, 44.24; H, 7.80; Sn, 34.0; active oxygen, 4.83; mol. wt. 3700.

Example 5.—Peroxide from diphenylgermanium dichloride and p-nitrobenzaldehyde

Ammonia was passed through a solution of diphenylgermanium dichloride (1.18 g.) in dry ether (50 ml.). The ammonium chloride which formed was removed by filtration. The filtrate was added to a solution of p-nitrobenzaldehyde (0.6 g.) and hydrogen peroxide (98%, 1.0 g.). After stirring at room temperature for 20 min., cooling precipitated 0.40 g. (40%) of peroxidic product.

Calculated for $C_{19}H_{15}GeNo_5$: Ge, 17.8; active oxygen, 3.91. Found: Ge, 14.0; active oxygen, 4.13.

Example 6.—Peroxide from di-n-butyltin-dimethoxide and cyclohexanone

Hydrogen peroxide (98%, 2.8 g.) was added at 0° C. to cyclohexanone (0.427 g.) and di-n-butyl-dimethoxide (1 ml.) in dry ether (100 ml.). The precipitate (1.40 g., 89%) which formed was collected by filtration, washed with dry ether, and dried. It decomposed at 133° C.

Calculated for $C_{14}H_{28}SnO_3$: C, 46.4; H, 7.73; Sn, 32.7; active oxygen, 4.41. Found: C, 46.08; H, 7.59; Sn, 32.77; active oxygen 4.54; mol. wt. 1010.

Example 7.—Peroxide from di-n-butyltin-dimethoxide and methylethylketone

Hydrogen peroxide (98%, 1.28 g.) was added at room temperature to di-n-butyltin-dimethoxide (1.28 g.) and methylethylketone (30 ml.). After the mixture had been stored for one hour at 0° C., filtration produced 1.50 g. (98%) of the peroxide which decomposes at 119° C.

Calculated for $C_{12}H_{27}O_3Sn$: C, 42.6; H, 7.99; Sn, 35.17; active oxygen, 4.74. Found: C, 42.51; H, 7.79; Sn, 35.47; active oxygen 4.79.

While there have been described and illustrated preferred embodiments of the present invention it is apparent that numerous alterations, omissions and additions may be made without departing from the spirit thereof. For example, the reactants earlier set forth may be substituted for the reactants in the above examples and corresponding end products produced.

What is claimed is:

1. The reaction product of an organometallic derivative of a Group IVb metal possessing a plurality of replaceable function moieties of said metal, hydrogen peroxide, and an aldehyde or a ketone.

2. The product of claim 1 comprising a group of the formula $$-O-\underset{R_2}{\overset{R_1}{M}}-O-O-\underset{R_4}{\overset{R_3}{C}}-$$

wherein M is said metal, $R_1$ and $R_2$ are each selected from the group consisting of aliphatic straight chain alkyl radicals of 1 to 18 carbons, aliphatic branched chain alkyl radicals of 3 to 18 carbons, carbocyclic radicals of 5 to 6 carbons, aryl radicals of 6 to 24 carbons, aralkyl radicals of 7 to 24 carbons and the radical $$-O-O-\underset{R_4}{\overset{R_3}{C}}-O-\underset{R_2}{\overset{R_1}{M}}-$$

and $R_3$ and $R_4$ are selected from the group consisting of hydrogen, aliphatic straight chain alkyl radicals of 1 to 18 carbons, aliphatic branched chain alkyl radicals of 3 to 18 carbons, carbocyclic radicals of 5 to 6 carbons, aryl radicals of 6 to 24 carbons, and aralkyl radicals of 7 to 24 carbons.

3. The product of claim 2 of the formula $$\left(-O-\underset{R_2}{\overset{R_1}{M}}-O-O-\underset{R_4}{\overset{R_3}{C}}-\right)_n$$

wherein $n$ is an integer between 1 and 1000.

4. The product of claim 1 wherein said organometallic derivative is a dialkyltin dialkoxide having between 2 and 36 carbons.

5. The product of claim 2 wherein said organometallic derivative is an organic germanium dichloride having between 2 and 36 carbons.

6. The method for producing the product of claim 1 comprising admixing hydrogen peroxide with an aldehyde or ketone and said organometallic derivative in an organic solvent.

7. The method of claim 6 wherein said replaceable functional moieties are active potential negative ion groups.

8. The method of claim 6 wherein the molal proportion to said hydrogen peroxide of said aldehyde or ketone is 0.5:1.5, and of said organic derivative of said metal is 0.5:1.5.

9. The method of claim 6 wherein the reaction is effected at a temperature of −10° C. to 30° C. to produce a precipitate, and separating said precipitate.

10. The product of claim 2 wherein said metal is tin or germanium and said replaceable functional moiety is $OCH_3$ or chlorine.

References Cited

UNITED STATES PATENTS

| | | | |
|---|---|---|---|
| 2,591,675 | 4/1952 | Church et al. | 260—429.7 X |
| 2,593,267 | 4/1952 | Church et al. | 260—429.7 X |
| 2,980,633 | 4/1961 | Koehler et al. | 260—429.7 X |
| 2,985,604 | 5/1961 | Koehler et al. | 260—429.7 X |
| 2,985,607 | 5/1961 | Koehler et al. | 260—429.7 X |
| 2,989,412 | 6/1961 | Koehler et al. | 260—429.7 X |
| 3,152,156 | 10/1964 | Mageli et al. | 260—429.7 |
| 3,334,119 | 8/1967 | Cohen | 260—429 |
| 3,337,391 | 8/1967 | Clayton et al. | 260—429.5 X |
| 3,376,328 | 4/1968 | Davies | 260—429.7 |

OTHER REFERENCES

Jenker, Z. Naturforschg. (1956), vol. 11b, p. 757, Q3Z4.

TOBIAS E. LEVOW, Primary Examiner

W. F. W. BELLAMY, Assistant Examiner

U.S. Cl. X.R.

252—431; 260—429, 429.5, 429.3, 437, 448.2